United States Patent
Iwauchi

(10) Patent No.: US 8,228,549 B2
(45) Date of Patent: Jul. 24, 2012

(54) DATA PROCESSING APPARATUS

(75) Inventor: Nobuyuki Iwauchi, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 545 days.

(21) Appl. No.: 12/536,152

(22) Filed: Aug. 5, 2009

(65) Prior Publication Data

US 2010/0033749 A1    Feb. 11, 2010

(30) Foreign Application Priority Data

Aug. 8, 2008 (JP) .................. 2008-205747

(51) Int. Cl.
*G06K 15/00* (2006.01)
(52) U.S. Cl. .............. 358/1.16; 358/1.13; 358/1.14; 710/5
(58) Field of Classification Search ............ None
See application file for complete search history.

(56) References Cited

U.S. PATENT DOCUMENTS

| 6,675,177 | B1 * | 1/2004 | Webb ........................ 1/1 |
| 6,826,664 | B2 * | 11/2004 | Hocker, III et al. ........ 711/157 |
| 6,982,811 | B2 | 1/2006 | Sato |
| 7,478,113 | B1 * | 1/2009 | De Spiegeleer et al. ...... 1/1 |
| 2004/0015864 | A1 * | 1/2004 | Boucher ................... 717/124 |

* cited by examiner

*Primary Examiner* — Chan Park
(74) *Attorney, Agent, or Firm* — Canon USA Inc. IP Division

(57) ABSTRACT

When a plurality of documents is read to generate an image file including a plurality of pages in a storage medium, if a capacity of the storage medium is short during generation, a storage control unit returns a writing position so that file end information can be written and writes the file end information therein. Further, when a cancellation instruction is input during reading of a document, the storage control unit writes the file end information even when a file is being generated. Thus, even if a memory capacity comes short in the middle of a page or file generation is interrupted by cancellation operation, the generated file can be prevented from resulting in an incomplete file that cannot be displayed.

5 Claims, 8 Drawing Sheets

FIG. 4

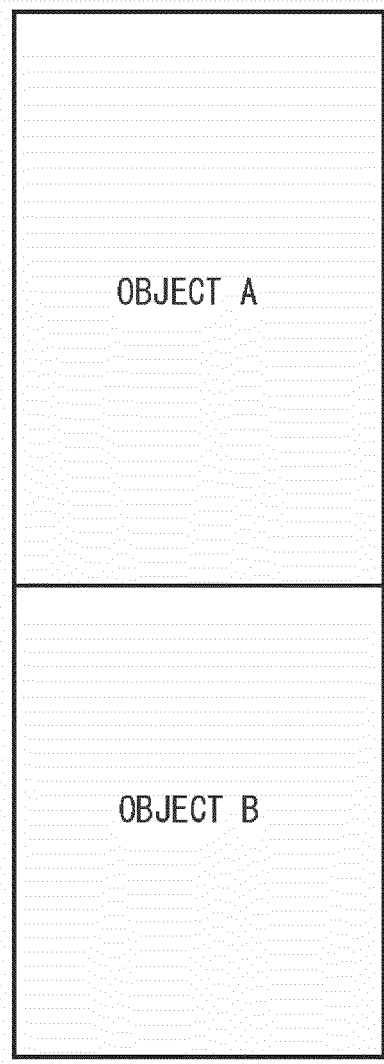

```
         41  50obj
             <<
             /Type/XObject/Subtype/Image
             /Width 90R
             /Height 100R
             /ColorSpace/DeviceRGB
             /BitsPreComponent8
             /Length 70R
             /Filter/DCTDecode
             >>
             stream
             (JPEGDATA)
             endsream
             endobj 70obj
             914283
         42  endobj
             40obj
             <<
             /Type/Page
             /Parent30R
             /Resources<</ProcSet[/PDF/ImageB/ImageC]/XObject
             <</Im150R>>
             >>
             /Rotate 0
             /MediaBox[00595.275 841.889]
             /Contents[90R60R]
             >>
             endobj
             60obj
             <</Length80R>>
             stream
             q
             599.040 0 0 844 319 0-2.430cm
             /Im1 Do
             Q
             endstream
             endobj
             80obj
             46
             endobj
             90obj
             1248
             endobj
             100obj
             1759
             endobj
```

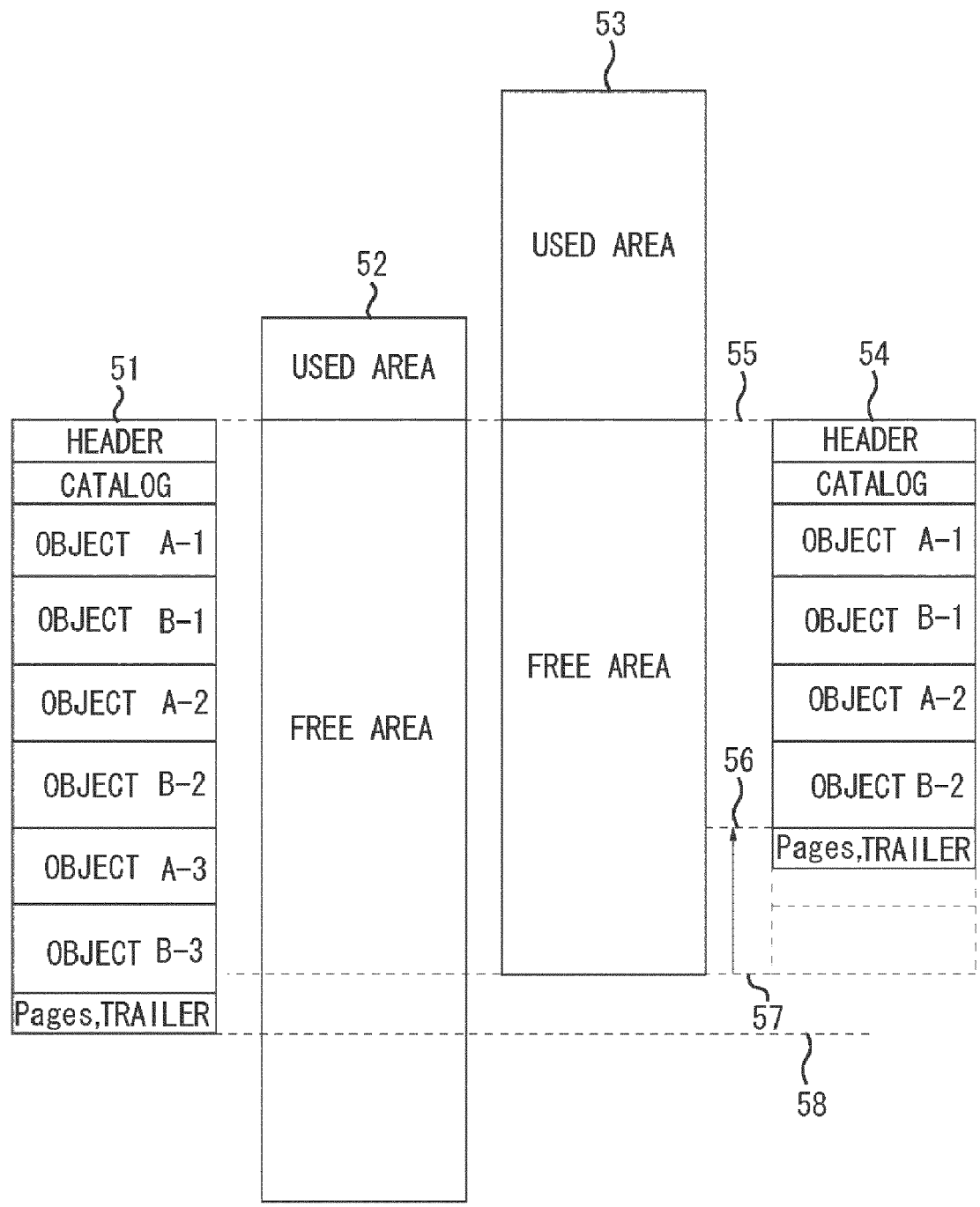

DATA PROCESSING APPARATUS

BACKGROUND OF THE INVENTION

1. Field of the Invention

The present invention relates to a data processing apparatus for generating an image file including a plurality of images obtained by reading a plurality of documents.

2. Description of the Related Art

A function of a scanner, a printer, and a multifunction peripheral (MFP) apparatus integrated with a scanner function has been diversified. One of them includes a function of reading a document by a scanner to generate a data file of the read image. This generated data file is stored in a memory card attached to the MFP apparatus, an external storage medium such as a universal serial bus (USB) memory, or an external storage apparatus such as a personal computer (PC).

A file format of a data file to be generated like this includes, for example, a Portable Document Format (PDF) file, a Joint Photographic Experts Group (JPEG) file, and a Tag Image Tile Format (TIFF) file. For example, in the PDF file, a plurality of read images can be stored as one data file and a plurality of related images can be collected into one file and managed.

However, generation processing of a data file may be interrupted by cancellation operation or the like during reading, and the data file may be stored in an incomplete state. In this case, there is a problem that in some applications, a file is not restorable such that the contents of a data file cannot be displayed or the like.

Thus, a technique has been proposed in which file generation processing ends after a restorable file is generated even if generation processing of a data file is interrupted on the way.

For example, in a technique described in U.S. Pat. No. 6,982,811, it is confirmed whether cancellation of file generation processing is performed every time read image data of one page is generated. When cancellation is performed, a PDF file up to a page where a file has been established is generated.

In other words, since interruption of file generation processing is determined after an image of one page is read, incomplete data can be prevented from being generated.

In the above-described technique, after an image of one page is inputted, cancellation of file generation processing is determined. In other words, it is assumed that a memory, which can store image data of one document, is prepared in an apparatus.

However, an apparatus is also present, which does not have a memory capable of storing image data on such one document. In such an apparatus, the read image data is successively transmitted to an external storage medium to generate a file in the external storage medium.

Accordingly, when data file generation processing is interrupted during reading of pages, in the external storage medium, data until during reading of pages will already be added to a file.

For example, when a PDF file is generated while a plurality of images read by a scanner is successively written into a universal serial bus (USB) memory attached to an MFP apparatus, if data file generation processing is interrupted in the middle of a page, an image will be broken on the way. When such a file is provided, the PDF file cannot properly be opened.

Further, as another case, when a capacity of a USB memory is filled up during reading of documents, a writing error may occur and thereafter storage processing may end. For this reason, even if the generated image file is intended to be displayed, a file cannot properly be opened similarly to the above-described problem.

The above-described problem will be described in detail referring to FIG. 8. FIG. 8 is a diagram illustrating one example of a document file configuration. As illustrated in FIG. 8, when a document data file is roughly classified, the document data file includes a header 31, a catalog 32, a plurality of objects 33, and trailer information 35.

The header 31 contains header information that provides a key to specify the document. For example, in a PDF, the header 31 contains a character string such as "% PDF-1.4". The catalog 32 corresponds to a table of contents of documents. The catalog 32 is defined as a cross-reference table (referred to as Xref) storing a position in a file of an object.

The object 33 corresponds to one page to n (n is an integer of 2 or more) pages. Each object contains a drawing object such as a font to be used in a document, a text, a graphic, and an image. The object includes description of each page to be drawn. For example, when an image is contained in a page, the object includes information on image data, a data size, a width, a height, and a drawing position.

The Pages object 34 is a pointer to each page. A number of page described in this Pages object 34 is recognized as the number of page of the PDF file. For example, when the PDF file is displayed, an image having the number of the page is provided for display.

The trailer information 35 stipulates the number of elements of a table of an Xref table and a start address of a cross-reference table. For a PDF file, these kinds of information are required. When data is broken on the way, the PDF file cannot be displayed.

SUMMARY OF THE INVENTION

The present invention is directed to a data processing apparatus that can generate a file with an accurate format even if file generation is interrupted in the middle of a page while read document data is subsequently written to generate a file.

According to an aspect of the present invention, a data processing apparatus which reads a plurality of documents to generate an image file of a plurality of pages includes a reading unit configured to read a document; an input unit configured to cause the reading unit to be controlled to read a document and input image data corresponding to a part of the document; a memory for storing the image data that the input unit inputs; a first generation unit configured to generate an object for including a page to be contained in an image file based on the image data stored in the memory for every time the image data is stored in the memory; a second generation unit configured to generate file end information in response to end of input of data by the input unit; and a storage control unit configured to store the data in a storage medium in response to generation of data in the first generation unit or the second generation unit, wherein when a free capacity for storing file end information is exhausted in a storage medium before file end information to be generated in the second generation unit is stored, the storage control unit returns a writing position to write file end information into the storage medium.

Further features and aspects of the present invention will become apparent from the following detailed description of exemplary embodiments with reference to the attached drawings.

BRIEF DESCRIPTION OF THE DRAWINGS

The accompanying drawings, which are incorporated in and constitute a part of the specification, illustrate exemplary embodiments, features, and aspects of the invention and, together with the description, serve to explain the principles of the invention.

FIG. 4 illustrates objects in the PDF file configuration.

FIG. 5 illustrates an example usage state of a memory of an external storage medium when a PDF file is written into the external storage medium.

DETAILED DESCRIPTION OF THE EMBODIMENTS

Various exemplary embodiments, features, and aspects of the invention will be described in detail below with reference to the drawings.

Figure 1:
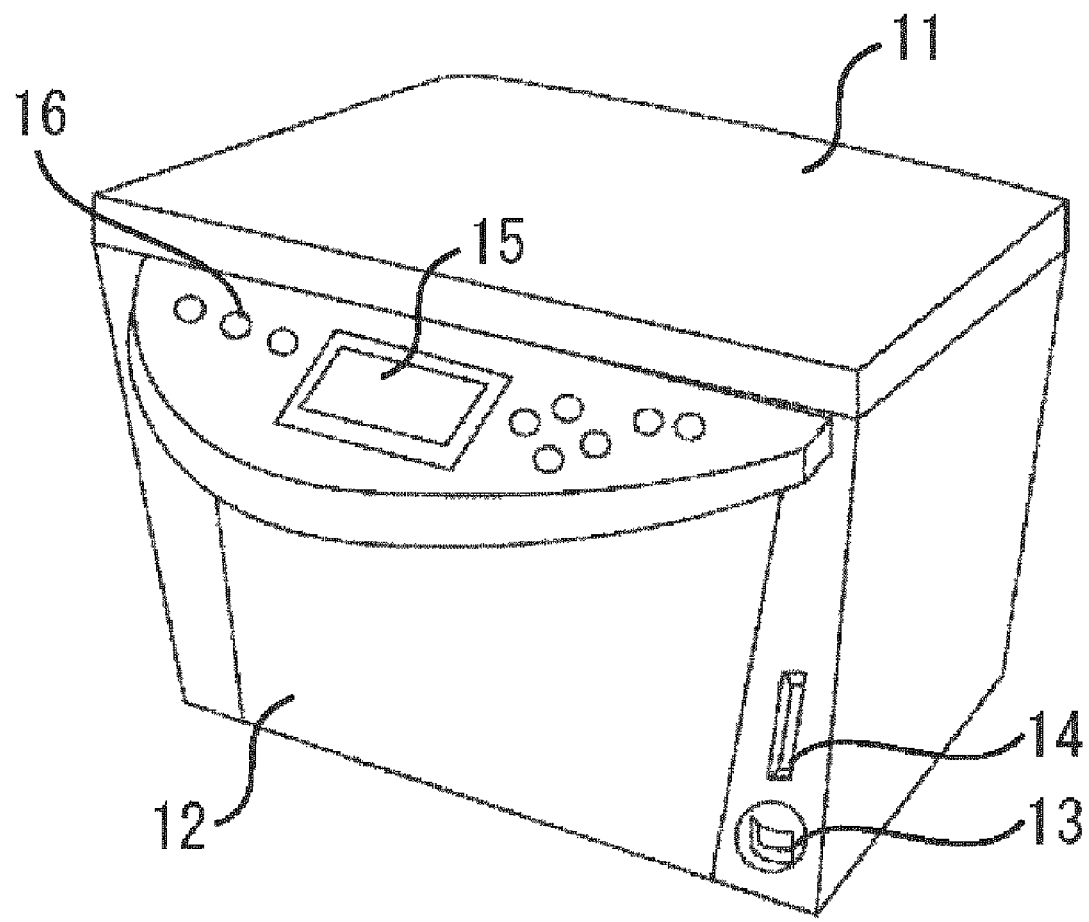
FIG. 1 is a schematic perspective view illustrating an MFP apparatus according to a present exemplary embodiment.

FIG. 1 is a schematic perspective view illustrating an MFP apparatus 100 according to the present exemplary embodiment.

The MFP apparatus 100 includes an upper cover 11, a paper discharge tray 12, a connector 13, a card slot 14, a display unit 15, and an operation unit 16. In a state illustrated in FIG. 1, the upper cover 11 is closed. However, the upper cover 11 is opened, thereby allowing a document to be placed on a document plate.

Further, in a state illustrated in FIG. 1, the paper discharge tray 12 is closed. However, when print is performed, the paper discharge tray 12 is opened, thereby functioning as a paper discharge tray of a printed out paper.

To the connector 13, a digital camera can be connected. When the digital camera is connected to the connector 13, image data, which is stored in a memory inside the digital camera, can be read and printed by the MFP apparatus 100. Further, the connector 13 can be used to connect an external storage medium such as a USB memory, thereby allowing image data, which is stored therein, to be read and written.

The card slot 14 is used to insert a memory card. The MFP apparatus 100 can read and print image data, which is stored in the inserted memory card, via the card slot 14. As described above, in the MFP apparatus 100 according to the present exemplary embodiment, the connector 13 and the card slot 14 are provided as connection portions, thereby allowing an external storage medium to be attached thereto.

The display unit 15 is a display screen such as a light emitting diode (LED) and a liquid crystal display. The display unit 15 displays an image, various kinds of guidance, or the like. For example, when an image intended to be printed is searched among images stored in a memory card, an image for each single frame, an index image, or the like is displayed on the display unit 15.

Further, in the MFP apparatus 100, various settings such as a paper size, a magnification and a copy density when copying, various settings such as resolution, and an output format, and a screen for operating a maintenance function of an apparatus or the like are displayed on the display unit 15. Furthermore, a screen that indicates a state of the MFP apparatus 100 when any trouble occurs in the MFP apparatus 100, or a screen that indicates the guidance of operation when prohibited operation is performed, is displayed on the display unit 15.

The operation unit 16 is an operation device to be operated by a user, and includes a plurality of operating keys such as arrow keys, a copy mode key and a print start key. The operation by the operation unit 16 is interlocked with a screen displayed on the display unit 15. A user presses these keys while viewing the display unit 15 to provide various instructions to the MFP apparatus 100.

This MFP apparatus 100 includes a function of receiving data from a host computer (hereinafter, referred to as PC) and printing, as a generally used printer for PC. Further, the MFP apparatus 100 includes a scan function of reading a document placed on a document plate performed in response to an operation via the operation unit 16. In addition, the MFP apparatus 100 includes a copy function of printing an image read using a scan function performed in response to an operation from a PC or the operation unit 16.

Furthermore, the MFP apparatus 100 includes a function of storing image data read using a scan function in a memory card attached to the card slot 14 or a USB memory connected to the connector 13 (referred to as a scan to memory function). Still furthermore, the MFP apparatus 100 includes a function of reading image data stored in a memory card and printing the image data and a function of receiving image data from a digital camera connected to the connector 13 and printing the image data.

Figure 2:
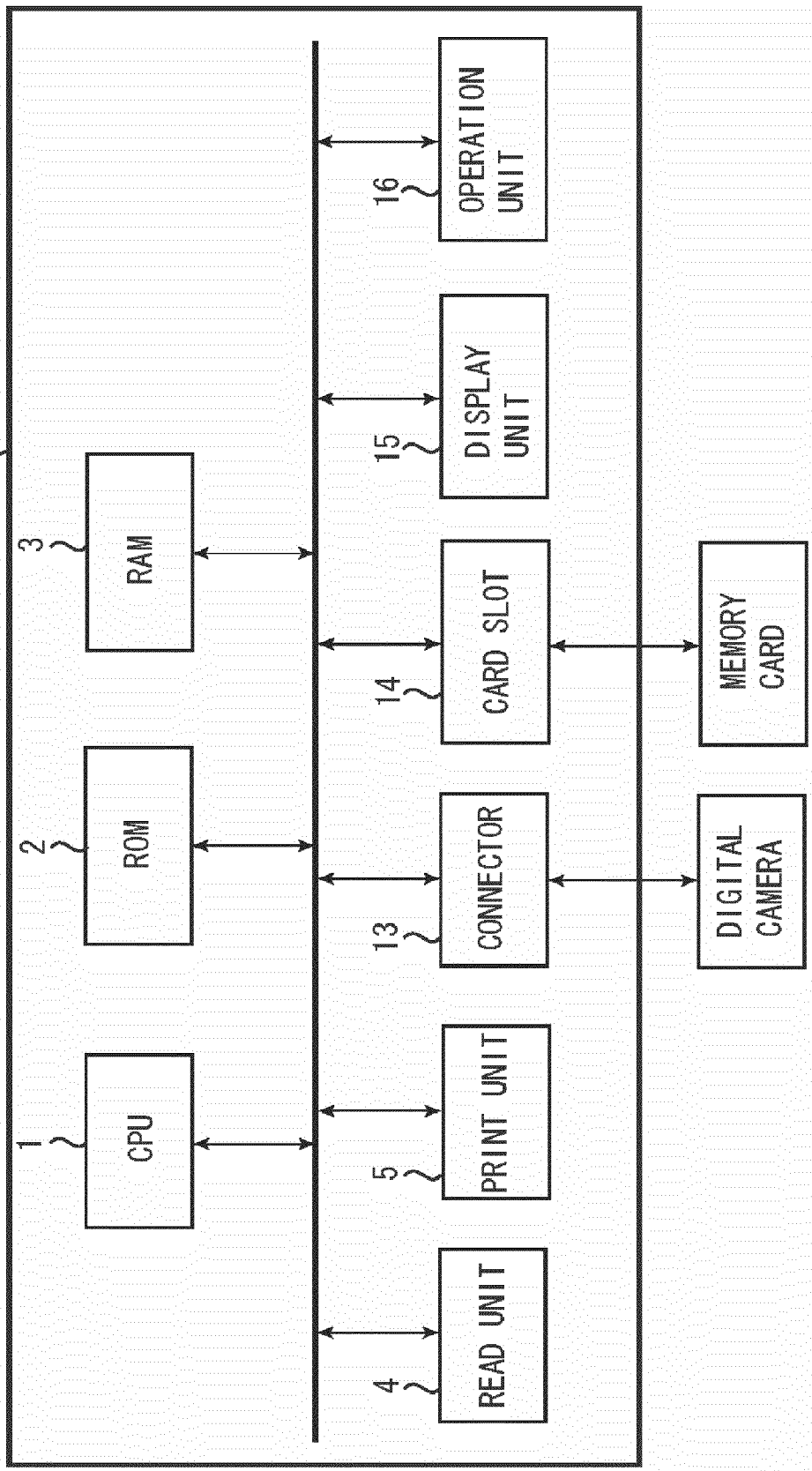
FIG. 2 is a block diagram illustrating a configuration of the MFP apparatus.

FIG. 2 is a block diagram illustrating a configuration of the MFP apparatus 100.

A CPU 1 (microprocessor) operates according to a control program stored in a read only memory (ROM) 2 serving as a program memory, which is connected to the CPU 1 via an internal bus, to control the whole MFP apparatus 100.

A reading unit 4 is a mechanism as a read apparatus. The reading unit 4 reads a document placed on a document plate by scanning thereof with an image sensor (not illustrated). A print unit 5 is a mechanism as a print apparatus. The print unit 5 executes operation such as feeding, delivering, and discharging of a recording paper and executes printing on the recording paper using, for example, an inkjet recording system in which ink is discharged.

The CPU 1 causes the reading unit 4 to store document image data that is read by an image sensor (not illustrated) provided in the reading unit 4 by scanning the image data, in a read buffer memory in a random access memory (RAM) 3. The document image data stored in the read buffer memory is read by the CPU 1, converted into print data, and then stored in a print buffer memory in the RAM 3.

The CPU 1 causes the print unit 5 to operate, and also reads the print data stored in the print buffer memory, transmit the print data to the print unit 5 and print the print data, thereby realizing copy operation.

The read buffer memory, the print buffer memory, and the image memory on the RAM 3 can operate by changing distribution of a capacity of each memory dynamically and allocating the capacity according to an operation situation such as an operation mode and a user setting by the management of the CPU 1.

However, the read buffer memory can store image data read in unit of a read band while scanning a document with the image sensor. The read buffer memory does not have a capacity to store image data of the whole document placed on a document plate. The connector 13, the card slot 14, the display unit 15, and the operation unit 16 are similar to those described in FIG. 1. Thus, description will be omitted.

When the scan to memory function is executed, first, the CPU 1 controls the reading unit 4 to read a document placed on a document plate and store in the read buffer memory in the RAM 3 in sequence. Then, the stored image data is transmitted to a memory card or a digital camera via the card slot 14 and the connector 13 in order by control of the CPU 1.

Figure 3:
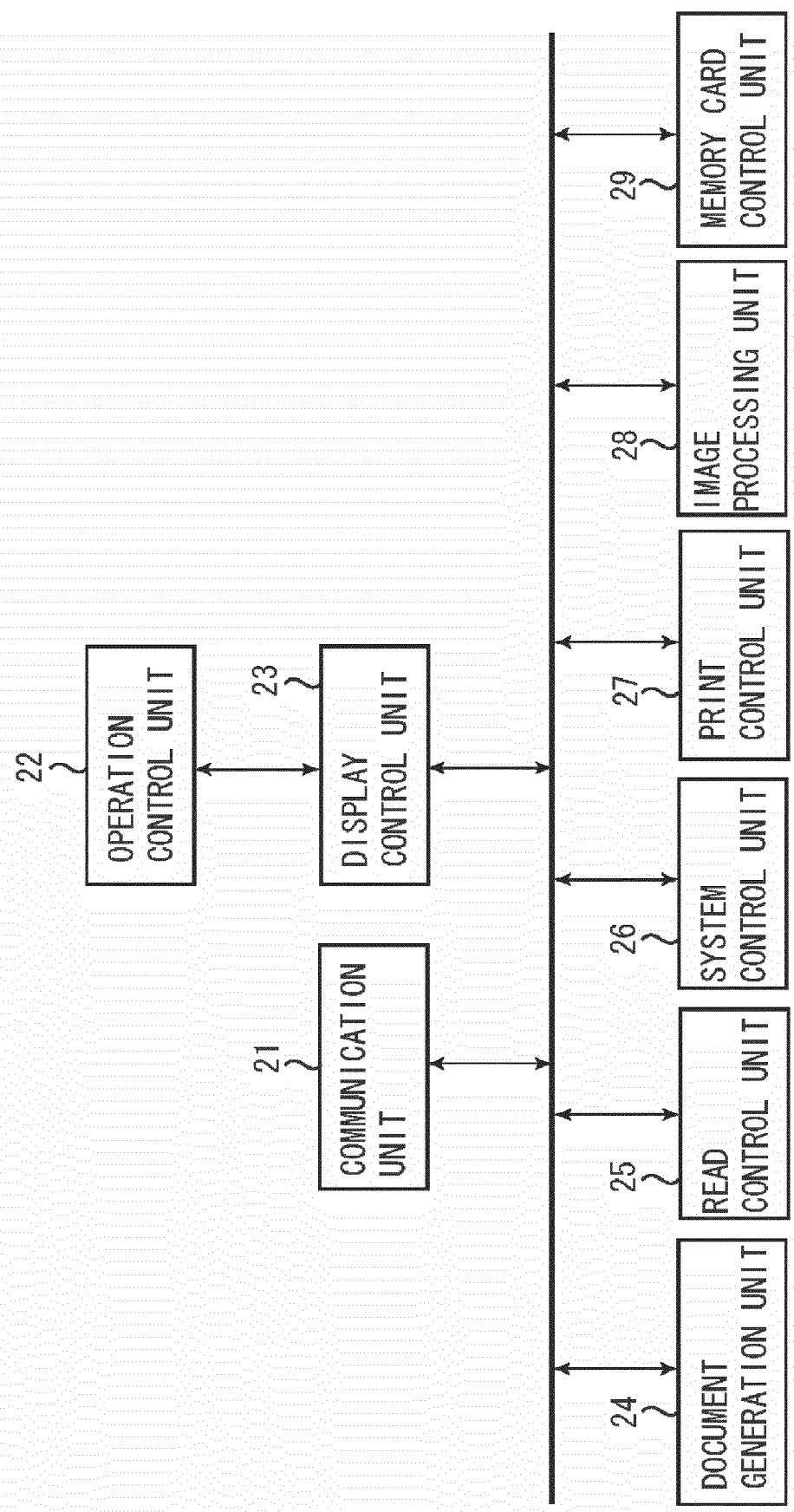
FIG. 3 is a block diagram illustrating a function of the MFP apparatus to be executed by a central processing unit (CPU).

FIG. 3 is a block diagram illustrating a function of the MFP apparatus 100 to be executed by the CPU 1. This function is realized by control of the CPU 1 according to a program stored in the ROM 2 in the MFP apparatus 100.

A communication unit 21 controls data communication between the MFP apparatus 100 and a PC connected to a connector for a PC (not illustrated). An operation control unit 22 detects press of various keys of the operation unit 16 of the MFP apparatus 100, converts it into a logical key operation message, and inputs an instruction into the CPU 1. Further, this inputted instruction is transmitted to various units in FIG. 3.

A read control unit 25 controls the reading unit 4 to read a document placed on the document plate, input image data, and store it in a read buffer memory. Similarly, a print control unit 27 controls the print unit 5 to execute control for print processing such as discharge control of an ink droplet, feed of paper, discharge of paper, control of a print head, copy print, photo print, and PC print.

A display control unit 23 controls the display unit 15 to execute various kinds of display such as an image and guidance to a user. For example, when an image is stored by the scan to memory function, guidance of input is displayed to a user when a read size is set for a document to be read.

Further, the display control unit 23 switches guidance display for a user in response to a key operation message transmitted from the operation control unit 22. A system control unit 26 is a unit configured to execute arbitration of various control units, and executes state management of the MFP apparatus 100 such as exclusive control of a physical resource, sequence control, various kinds of errors, and an ink remaining amount.

An image processing unit 28 converts data stored in a read buffer memory into a suitable image format. Further, the image processing unit 28 converts print data transmitted from a PC, and transmits it to the print control unit 27.

Furthermore, the image processing unit 28 executes decode processing and trimming processing of an image in photo print. Still furthermore, the image processing unit 28 also executes image processing such as processing of holding area information on a print layout to dispose image data in a layout position, scaling processing, color processing, binarization processing, and brightness, color saturation, and red-eye correction processing.

A memory card control unit 29 executes storage control processing of reading and writing an image file from and to a memory card, which is attached to the card slot 14. Further, the memory card control unit 29 analyses the detail of image data information stored in a memory card to manage a directory and allocates an image number to each of image data. Furthermore, the memory card control unit 29 stores document data generated by the scan to memory function in a memory card attached to the card slot 14.

A document generation unit 24 executes processing of image file generation in a memory card based on image data input from an image processing unit, which will be described later. When data necessary for file generation is generated in the document generation unit 24, the memory card control unit 29 writes the data into a memory card.

Image file generation processing according to the present invention will specifically be described below. Processing of storing a file in a memory card will be described. However, for example a file may also be stored in a PC through a PC connector.

After the upper cover 11 of the MFP apparatus 100 in FIG. 1 is opened and a document is placed on a document plate, a setting of a read size of a document, resolution or the like is executed using the operation unit 16. Then, the read document is stored in an external storage medium such as a memory card inserted into the card slot 14 or a USB memory connected to the connector 13 in response to an operation of an operating key such as a start key. The so-called "scan to memory processing" is started.

In the present exemplary embodiment, since it is image data processing when a plurality of read documents are stored as one file, description is given below by assuming an output format as a PDF.

If an image format in the present invention is a format capable of storing a plurality of images as one PDF file, the image format in the present invention is not particularly limited. However, in the present invention, description is given assuming that the image format is converted into a JPEG format by the document generation unit 24.

When the scan to memory processing is started, the read control unit 25 inputs image data and the image processing unit 28 converts it into a JPEG image format. The converted data is transmitted to the document generation unit 24. Data to be subjected to subsequent processing as a PDF format is written into a memory card.

Figure 8:
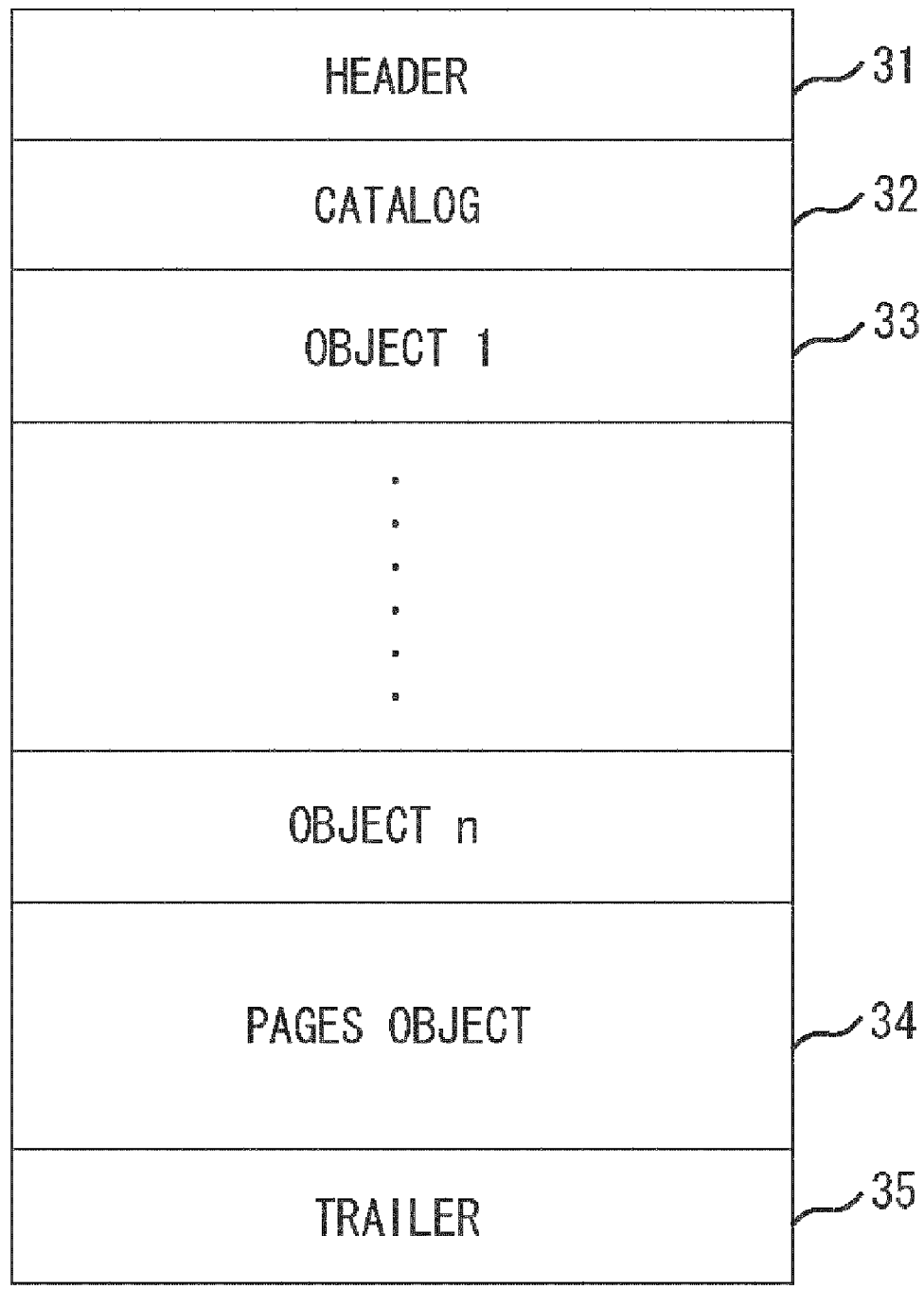
FIG. 8 illustrates an example of a document file configuration.

A whole PDF file has a document file structure illustrated in FIG. 8 described above. However, as one document contained therein, data is generated in a form illustrated in FIG. 4. FIG. 4 is a diagram illustrating the object 33 in a PDF file configuration and corresponds to the object 33 in FIG. 8.

An object A41 contains what an image format of the object is, information on a width, a height, and a color profile of the image, and actual data of the image. On the other hand, an object B42 indicates a width, a height, and a size of image data of the read document.

When the read control unit 25 finishes reading of the designated document read size, the object B42 is generated by the document generation unit 24 and written into an external storage medium together with the object A41.

When a plurality of documents are formed in one PDF file, the same number of data as the number of the documents illustrated in FIG. 4 will be generated.

A case in which a free capacity of an external storage medium falls short during reading of a document will be described referring to FIG. 5.

FIG. 5 illustrates an example usage state of a memory of an external storage medium when a PDF file is written into the external storage medium. In FIG. 5, n=3 is given and a PDF file 51 storing three documents is written into a storage medium.

A memory area of this storage medium is generally managed through a file system. The file system executes accesses to the memory area as an arrangement of a fixed block normally with 512 bits, which is referred to as "sector". Further, the file system manages a plurality of sectors in unit of a cluster, refers to a cluster, and grasps a file-used cluster and a file-unused cluster.

Furthermore, in order to access the file system, a function of operating a file such as open processing, read processing, write processing, and close processing is incorporated, and is executed by the CPU 1.

As illustrated in FIG. 5, a case in which the PDF file 51 is written into storage mediums 52 and 53 using the file system will be described below. An object A-n and an object B-n indicate an object A and an object B illustrated in FIG. 4 in an object of an image of n-th page. Since three documents are stored here, n=3 will be given.

In the storage medium 52, since a free capacity is larger than the PDF file 51, the MFP apparatus 100 can write a file in areas from 55 to 58.

On the other hand, in the storage medium 53, since a free capacity is smaller than the PDF file 51, the MFP apparatus 100 can write a file only in areas from 55 to 57 in FIG. 5.

In other words, file writing is started from 55, while writing the object B-3, reaches the area 57, which is an end position of the storage medium 53, and results in a state that a part of the object B-3, a Pages object and a trailer can not be written into the storage medium 53. In this case, as a result, an incomplete PDF file is generated.

Thus, processing when a free capacity of a USB memory is filled up on the way or when read processing is interrupted on the way will be described below refereeing to a flowchart in FIGS. 6 and 7.

Figure 6:
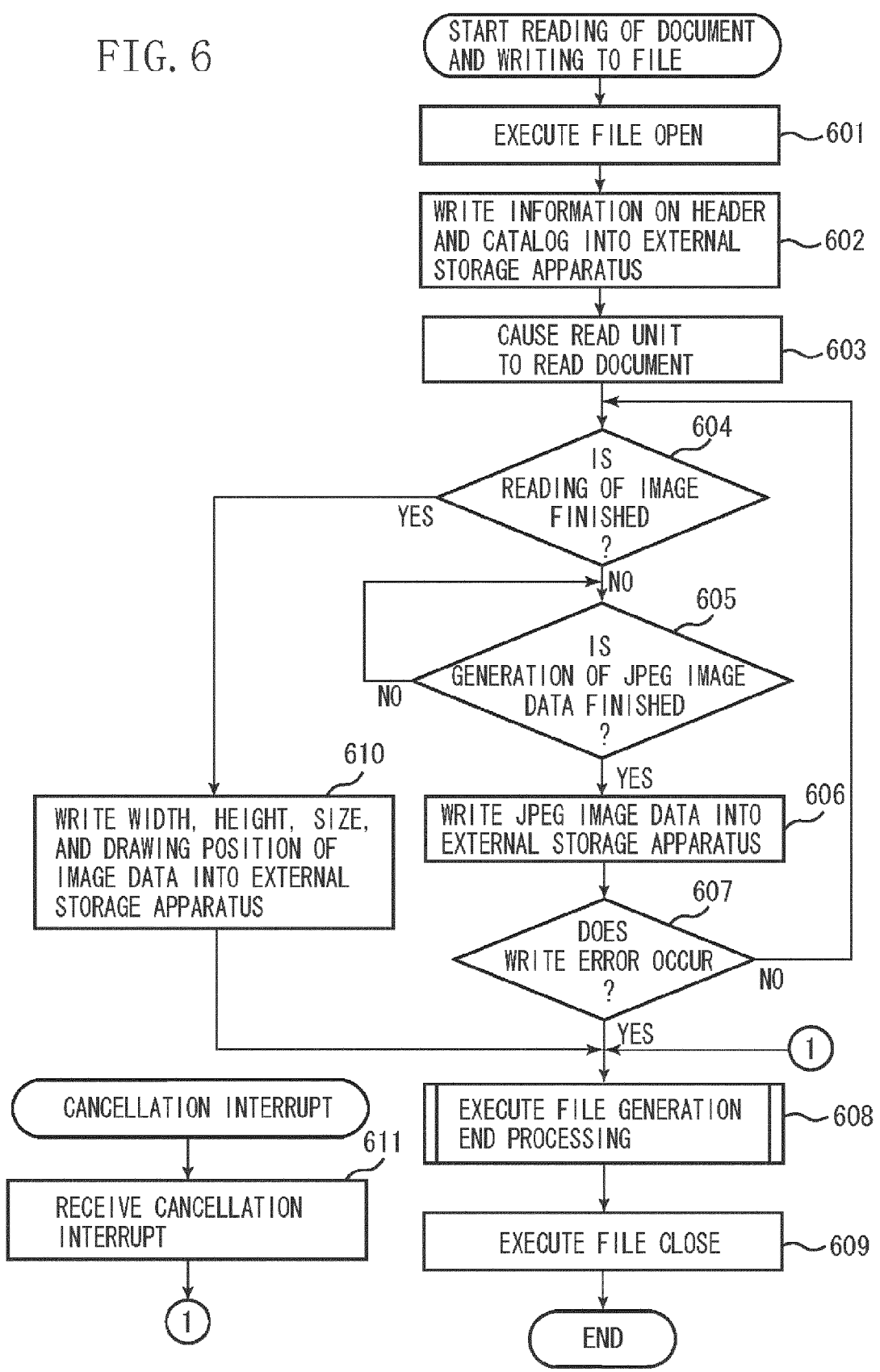
FIG. 6 is a flowchart illustrating PDF file generation processing.

FIG. 6 is a flowchart illustrating PDF file generation processing.

First, a start key positioned in the operation unit 16 of the MFP apparatus 100 is pressed by a user to start "scan to memory processing". Then, in step S601, file open is executed in a file write mode to an external storage medium such as a memory card inserted into the card slot 14 or a USB memory connected to the connector 13 as a storage destination.

In step S602, when file open is succeeded, header information, which corresponds to the head of a PDF file, and catalog information data are written into an external storage medium.

In step S603, the reading unit 4 is controlled by the read control unit 25 to read a document placed on a document plate. In step S604, when image data is input and stored in a read buffer memory by the read control unit 25, it is determined whether reading of a designated document size is finished.

When reading is not finished (NO in step S604), in step S605, it is confirmed whether image data on the read buffer memory is converted into a JPEG format by the image processing unit 28.

When it is converted into a JPEG format (YES in step S605), the processing proceeds to step S606. The image processing unit 28 writes converted JPEG image data into an external storage medium as a part of the object A41.

In step S607, it is determined whether a write error occurs. When no error occurs (NO in step S607), the processing returns to step S604 to continue to read an image until the reading unit 4 finishes reading a document.

Then, in step S604, when it is determine that the reading unit 4 has finished reading the image (YES in step S604), in step S610, a width, a height, a size, and a drawing position of image data are written into an external storage medium as an object B42.

In addition to the write error due to shortage of the free capacity of the above-described external storage medium, a user may press a key such as a cancel key and a power source key arranged in the operation unit 16 to interrupt file generation processing.

In step S611, it is in a state that a user interrupts the file generation processing by pressing a cancel key. At this time, similarly to the above, the file generation processing is interrupted.

Figure 7:
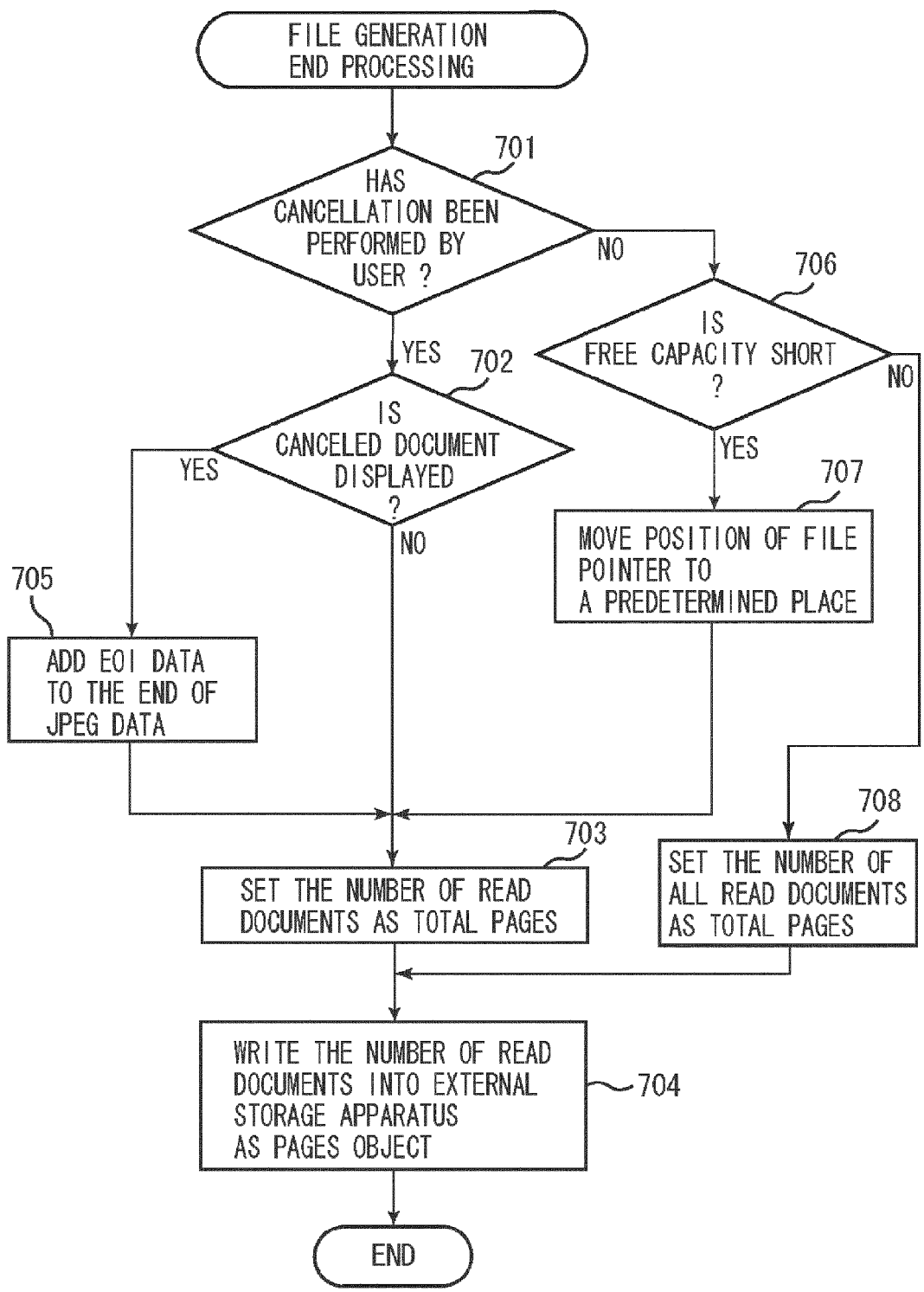
FIG. 7 is a flowchart illustrating PDF file generation end processing.

As described above, when reading of a document is finished, or a write error or cancellation interrupt occurs, in step S608, PDF file generation end processing, which will be described later in FIG. 7, is executed. Finally, in step S609, file close is executed and the processing ends.

When the above-described processing illustrated in FIG. 6 is executed to a plurality of documents, a PDF file including a plurality of pages is generated. The object 33 illustrated in FIG. 8 is generated by the processing in steps S605 and S610 in FIG. 6.

FIG. 7 is a flowchart illustrating PDF file generation end processing.

First, in step S701, it is determined whether a user has instructed cancellation according to whether a cancel key or a power source key has been pressed. When it is determined that a cancel key or a power source key has been pressed (YES in step S701), the processing proceeds to step S702 to determine whether to display a document of which writing has been cancelled, when a PDF file is displayed.

In other words, it is determined whether a document, which has been read up to the middle of the document, is displayed. As the determination unit, a unit configured to allow a user to select a storage method of an image when it has been cancelled may be provided on the display unit 15, or a storage method may be changed by an event input from the outside.

When an image is determined to be displayed (YES in step S702), end of image (EOI) data is added to the end of JPEG image data written until it is cancelled and complete it as a JPEG image. On the other hand, when an image is determined not to be displayed (NO in step S702), the processing proceeds to step S703.

In step S703, the number of read documents is stored in an internal storage medium such as the RAM 3 as a total page. When the cancelled document is added to a page to be displayed (YES in step S702), the number of pages containing an image that is written up to the middle of the document is stored.

On the other hand, when the cancelled document is not added to a page to be displayed (NO in step S702), the number of pages up to an image, which is written just before cancellation, is stored.

Further, when the read document data is successively written, a free capacity of an external storage medium may fall short, as a factor other than cancellation operation by a user.

In this case, in step S706, it is determined whether a free capacity is short. When the free capacity is short (YES in step S706), in step S707, a position of a file pointer, which indicates a write position, is moved to a predetermined position.

In other words, file end information is overwritten on the stored image data. For an amount of movement of the file pointer, the file pointer is moved to a file position 56 corresponding to a head address of the object A-3, which is a document that is not read to the end, from the storage medium 53 in FIG. 5 is on the way.

Alternatively, the file pointer may be moved by a size that trailer information is written into an external storage medium. In this case, after the file pointer is moved, total number of pages to be stored in an internal storage medium in step S703 may be set to be the number of documents up to a page just before the document without including the document which is not finished reading. Also, including the document that is not finished reading to the end, the total pages may be determined containing an image in which a part of the image is overwritten by the file end information.

On the other hand, when a free capacity is present (NO in step S706) and image data of one read document can entirely be written, in step S708, the number of all read documents is stored in an internal storage medium as total pages.

Next, in step S704, a Pages object that indicates the number of read documents and trailer information 35 are written into an external storage medium as file end information. This number of read documents is the number of total pages written into an internal storage medium in step S703 or step S708.

According to the above-described exemplary embodiment, when a file with a plurality of images is generated by a "scan to memory function", even if reading is interrupted during reading of an image, a file, which can normally be displayed, can be generated. Further, it can be selected whether an image read until on the way is provided for display.

In the above-described exemplary embodiment, a PDF file format has been described as an example. However, the present invention is not limited to this. For example, for a TIFF format or the like, the present invention is effective.

Further, the present invention may be applied to a file format that includes one image as well as a file format, which includes a plurality of images. For example, the present invention is also effective when cancellation occurs during generation of a JPEG image, and when a memory remaining amount is insufficient for writing the EOI data.

Furthermore, in the above-described exemplary embodiment, an image is stored in an external storage medium such as a memory card, as an example. However, the present invention is not limited to this. An image may also be stored in a storage medium in the apparatus. Still furthermore, an image may be stored in a storage medium provided with an external apparatus connected to a network.

Further, in the above-described exemplary embodiment, an MFP apparatus, as an example, generates a data file. However, the present invention is not limited to this. For example, the present invention is effective even when a file is generated in a PC based on image data read from a scanner apparatus. In this case, the PC functions as a control unit, in the above-described exemplary embodiment, which includes a CPU, a ROM and a RAM.

Further, the purpose of the present invention is also attained by supplying a storage medium recording a program code which realizes a function of the above-described control unit to a system or an apparatus. In this case, the present invention can be realized by causing a computer (or CPU or micro processing unit (MPU)) on a system or an apparatus to read and execute the program code.

In this case, the program code read from the storage medium realizes a function of the above-described exemplary embodiment. The storage medium storing the program code and the program code itself will constitute the present invention.

A storage medium for supplying a program code includes, for example, a hard disk, a compact disc read only memory (CD-ROM), a compact disc-recordable (CD-R), a nonvolatile memory card, a read only memory (ROM), a digital video disc (DVD), and others.

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures, and functions.

This application claims priority from Japanese Patent Application No. 2008-205747 filed Aug. 8, 2008, which is hereby incorporated by reference herein in its entirety.

What is claimed is:

1. A data processing apparatus for generating an image file including a plurality of pages, the data processing apparatus comprising:
an input unit configured to cause a reading apparatus to read a document and input image data corresponding to a part of the document;
a first generation unit configured to generate an object that configures a page to be included in an image file based on the image data input by the input unit for each time the image data is input by the input unit;
a second generation unit configured to generate file end information for specifying a number of pages of the image file in response to an end of data input performed by the input unit; and
a storage control unit configured to store the data in a storage medium in response to generation of data in the first generation unit or the second generation unit,
wherein when a capacity for storing the file end information is insufficient in the storage medium before the file end information generated in the second generation unit is stored, the storage control unit returns a writing position to an address in which the file end information can be stored,
wherein the file end information indicates the number of images to be displayed, and wherein the file end information generated by the second generation unit indicates the number of images excluding an image that is overwritten due to the return of writing position by the storage control unit.

2. The data processing apparatus according to claim 1, further comprising an attaching portion capable of attaching an external storage medium, wherein the storage control unit stores data in the external storage medium attached to the attaching portion.

3. The data processing apparatus according to claim 1, wherein the storage control unit returns a writing position to the head address of the object generated in the first generation unit.

4. A method for controlling a data processing apparatus for generating an image file including a plurality of pages, the method comprising:
causing a reading apparatus to read a document and input image data corresponding to a part of the document;
generating an object that configures a page to be included in an image file based on the inputted image data;
generating file end information for specifying a number of pages of the image file in response to an end of data input; and
storing the data in a storage medium in response to generating the object or the file end information;
wherein when a capacity for storing the file end information is insufficient in the storage medium before the generated file end information is stored, returning a writing position to an address in which the file end information can be stored,
wherein the file end information indicates the number of images to be displayed, and wherein the file end information generated indicates the number of images excluding an image that is overwritten due to the return of writing position.

5. A non-transitory computer readable storage medium storing a program capable of causing a computer to function as the respective units of the data processing apparatus according to claim 1.

* * * * *